(12) United States Patent
Luo et al.

(10) Patent No.: US 9,514,535 B1
(45) Date of Patent: Dec. 6, 2016

(54) COLOR CALIBRATION METHOD OF CAMERA MODULE

(71) Applicant: THOUSAND LIGHTS LIGHTING (CHANGZHOU) LIMITED, Changzhou, Jiangsu Province (CN)

(72) Inventors: Ming Ronnier Luo, Changzhou (CN); Binyu Wang, Changzhou (CN)

(73) Assignee: THOUSAND LIGHTS LIGHTING (CHANGZHOU) LIMITED, Changzhou, Jiangsu Province (CN)

( * ) Notice: Subject to any disclaimer, the term of this patent is extended or adjusted under 35 U.S.C. 154(b) by 0 days.

(21) Appl. No.: 15/049,749

(22) Filed: Feb. 22, 2016

(30) Foreign Application Priority Data

Jun. 16, 2015 (CN) .......................... 2015 0 332640

(51) Int. Cl.
  *H04N 17/00* (2006.01)
  *G06T 7/40* (2006.01)
  *G06T 7/00* (2006.01)

(52) U.S. Cl.
  CPC ............. *G06T 7/0018* (2013.01); *G06T 7/408* (2013.01); *H04N 17/002* (2013.01); *G06T 2207/10024* (2013.01)

(58) Field of Classification Search
  CPC .. H04N 17/002; H04N 1/6033; H04N 1/6047; H04N 1/6086; H04N 1/6055; H04N 1/6036; H04N 1/6088
  See application file for complete search history.

(56) References Cited

U.S. PATENT DOCUMENTS

| | | | |
|---|---|---|---|
| 5,668,596 A * | 9/1997 | Vogel ..................... | H04N 9/045 348/222.1 |
| 2005/0018191 A1* | 1/2005 | Luo ........................... | G01J 3/46 356/404 |

* cited by examiner

*Primary Examiner* — Michael Teitelbaum
(74) *Attorney, Agent, or Firm* — Jiwen Chen (57) ABSTRACT

According to the present invention, firstly multiple reference parameter values of each color sample in a color chart are set, or a photograph and a measurement are performed on a standard color chart or a user-defined color chart in a certain standard lighting environment, multiple reference parameter values, SPD (λ)×R (λ) and brightness of each color sample are obtained. Then the SPD (λ)×R (λ) and the brightness of each color sample are reproduced by using a spectral tunable lighting source. Then each reproduced color sample is photographed by using the camera under the same settings to obtain multiple reproduced parameter values of each color sample. The two groups of parameter values are compared and a color calibration model is established. Finally color calibration of each batch of camera modules is implemented without the helping of a color chart and standard lighting environment. The present invention has the characteristics of high automation degree, high flexibility and adaptability, and high convenience in color changing and color sample calibrating, and thus has an extremely high practical value.

7 Claims, 8 Drawing Sheets

COLOR CALIBRATION METHOD OF CAMERA MODULE

The present application claims the priority benefit of Chinese Application No. 201510332640.7, filed Jun. 16, 2015, which is hereby incorporated by reference.

FIELD OF THE INVENTION

The present invention belongs to the field of color calibration, and particularly relates to a color calibration method of a camera module.

BACKGROUND OF THE INVENTION

With the rapid development of mobile Internet, mobile devices have also been widely applied to all fields of people's lives, and as a camera module serves as a very important component of a mobile device, increasing attention is paid to the imaging quality of the camera module.

The performance test of the camera module includes multiple test items including resolution ratio, white balance, gray scale and color, etc., where color calibration of the camera module is a very important item, and colors of images, such as sky blue, grass green and etc., can be accurately expressed only after color calibration.

The traditional color calibration method of a camera module includes photographing a standard color chart under the standard lighting cabinet, analyzing the relation between imaging data and the standard value of the standard color chart, and establishing a calibration module, thereby realizing the color calibration of the camera model. The traditional method has the following disadvantages: a standard lighting cabinet and a standard color chart are needed, the stability of the standard lighting cabinet is poor, the maintenance cost of the standard lighting cabinet is high, a considerably experienced operator is needed during the whole calibration process, the process is time-consuming, and color samples needed by a user cannot be customized for color calibration.

SUMMARY OF THE INVENTION

In order to solve the disadvantages of the traditional calibration method of a camera module, the present invention provides a color calibration method of a camera module, characterized by a high degree of automation, improved light source stability and great flexibility. The present invention adopts the technical scheme as follows:

1) selecting a standard color chart or a user-defined color chart;
2) providing multiple reference parameter values of each color sample in the color chart, the multiple reference parameter values are denoted as $X_1$ to $X_n$, wherein n is an integer from 1 to 10; meanwhile providing a multiplication result of a spectral power distribution SPD ($\lambda$) and a spectral reflectance R ($\lambda$) of each color sample, and a brightness of each color sample in the color chart in a standard lighting environment;
3) reproducing the multiplication result of the spectral power distribution SPD ($\lambda$) and the spectral reflectance R ($\lambda$) of each color sample, and the brightness of each color sample by means of a spectral tunable lighting source;
4) sequentially photographing the each reproduced SPD ($\lambda$)×R ($\lambda$) and the brightness of each color sample in step 3) by the camera module, and obtaining multiple reproduced parameter values after processing, which are denoted as $X_1'$ to $X_n'$;
5) respectively establishing a color calibration model by comparing each reference parameter values $X_1$ to $X_n$ with those $X_1'$ to $X_n'$;
6) processing the parameter values $X_1'$ to $X_n'$ obtained through photographing of each camera module by means of the color calibration models established in the step 5), so as to obtain corresponding calibrated parameter values $X_1''$ to $X_n''$, thereby accomplishing color calibration of the camera module.

Preferably, in the step 2), the color chart is laid in a certain standard lighting environment and is photographed by using the camera module under certain settings, so that multiple reference parameter values of each color sample in the color chart are obtained after processing; meanwhile, in the standard lighting environment, the multiplication result of the spectral power distribution SPD ($\lambda$) and the spectral reflectance R ($\lambda$) of each color sample, and the brightness of each color sample in the color chart are measured by using corresponding measurement device.

Preferably, n=3, the reference parameter values $X_1$ to $X_3$ are RGB values, and the computational formulas thereof are as follows:

$$R = \Sigma \bar{r}(\lambda) \times \text{SPD}(\lambda) \times R(\lambda)$$

$$G = \Sigma \bar{g}(\lambda) \times \text{SPD}(\lambda) \times R(\lambda)$$

$$B = \Sigma \bar{b}(\lambda) \times \text{SPD}(\lambda) \times R(\lambda)$$

wherein, $\bar{r}(\lambda)$, $\bar{g}(\lambda)$ and $\bar{b}(\lambda)$ are spectral sensitivity curves of red, green and blue channels of the camera module, SPD ($\lambda$) is the spectral power distribution of a standard lighting environment, R ($\lambda$) is the spectral reflectance of the color sample, and $\lambda$ is a wavelength.

Preferably, the whole color calibration process needs to be done in a dark space without any other environmental lighting.

Preferably, the standard color chart or user-defined color chart in the step 1) comprises frequently-used 24-color X-Rite ColorChecker Classic, X-Rite ColorCheck Digital SG a color chart used in other industries, a user-defined color chart and a user-defined virtual color chart.

Preferably, the camera module in the step 4) includes a professional single-lens reflex camera, a consumer digital camera, an industrial camera, and mobile device camera modules and other imaging devices.

Preferably, the color calibration model in the step 5) is selected from one of the following models: a linear model, an exponential model, a polynomial model, a logarithmic model, a power model and a table lookup method.

According to the present invention, firstly multiple reference parameter values of each color sample in a color chart are set, or a photograph and a measurement are performed on a standard color chart or a user-defined color chart in a certain standard lighting environment, multiple reference parameter values, SPD ($\lambda$)×R ($\lambda$) and brightness of each color sample are obtained. Then the SPD ($\lambda$)×R ($\lambda$) and the brightness of each color sample are reproduced by using a spectral tunable lighting source. Then each reproduced color sample is photographed by using the camera under the same settings to obtain multiple reproduced parameter values of each color sample. The two groups of parameter values are compared and a color calibration model is established. Finally color calibration of each batch of camera modules is implemented without the helping of a color chart and standard lighting environment. The present invention has the characteristics of high automation degree, high flexibility

DETAILED DESCRIPTION OF THE EMBODIMENT

The present invention will be explained in detail in combination with the embodiments and the drawings as follows.

Embodiment I

Figure 1:
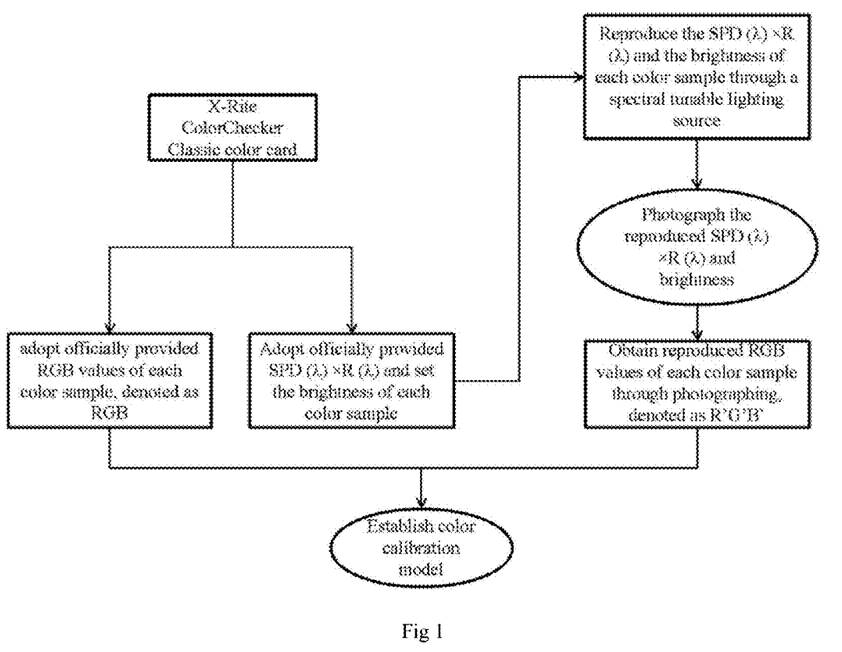
FIG. 1 is a flowchart according to Embodiment I.
Figure 2:
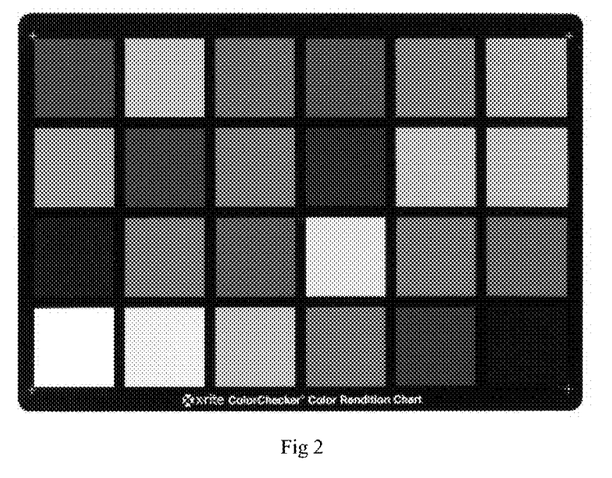
FIG. 2 is a diagram of a 24-color X-Rite ColorChecker Classic standard color chart adopted in the Embodiment I.
Figure 3:
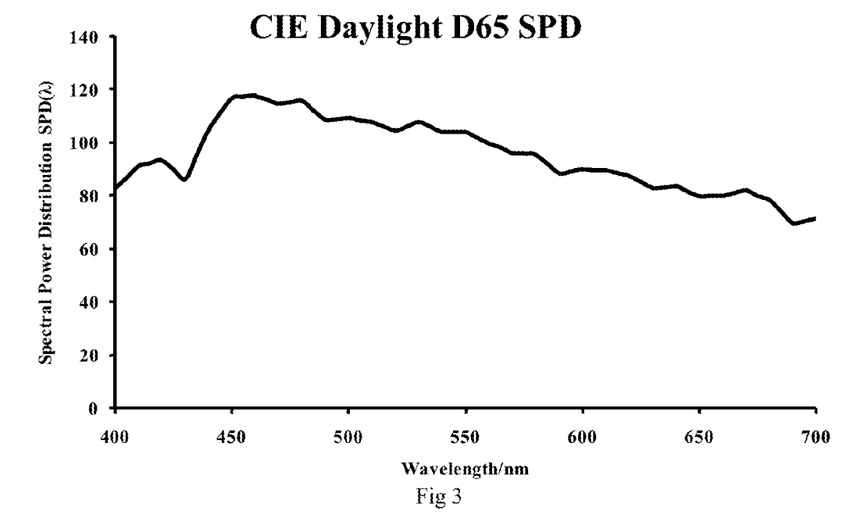
FIG. 3 is a diagram of spectral power distribution of standard daylight D65 defined by International Commission on illumination according to the Embodiment I.
Figure 4:
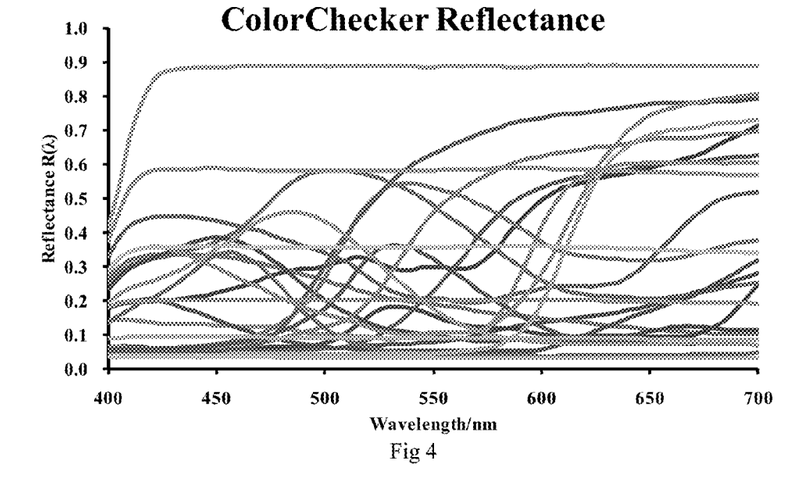
FIG. 4 is diagram of spectral reflectance supplied officially by the X-Rite ColorChecker Classic color chart according to the Embodiment I.
Figure 5:
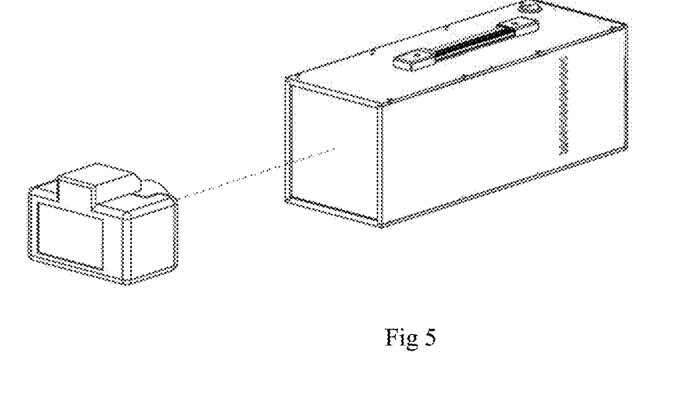
FIG. 5 is a setting diagram for the camera module photographing each color sample reproduced by a spectral tunable lighting source according to the Embodiment I.
Figure 6:
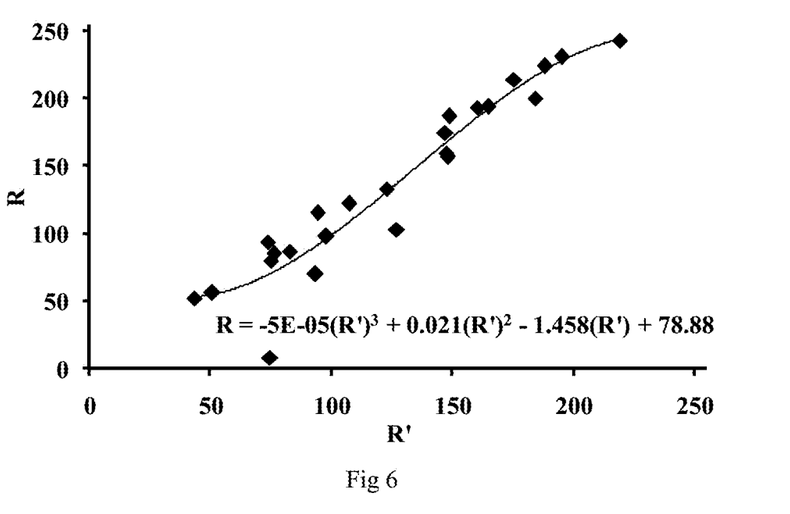
FIG. 6 is a diagram of polynomial calibration model of a red channel according to the Embodiment I.
Figure 7:
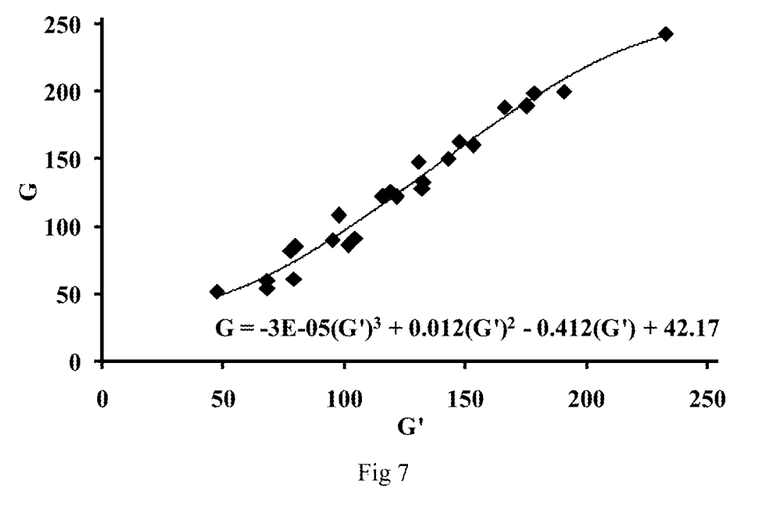
FIG. 7 is a diagram of polynomial calibration model of a green channel according to the Embodiment I.
Figure 8:
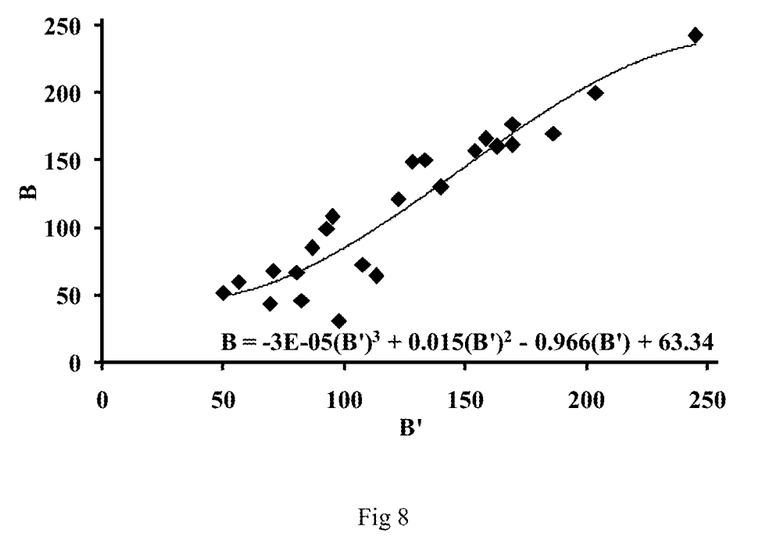
FIG. 8 is a diagram of polynomial calibration model of a blue channel according to the Embodiment I.

Taking the setting of RGB values, SPD $(\lambda) \times R\ (\lambda)$, brightness of each color sample and a Canon EOS 650D three-channel RGB camera as an example, the flowchart is as shown in FIG. 1, and the specific steps are as follows:

1) adopting a 24-color X-Rite ColorChecker Classic color chart as shown in FIG. 2;

2) adopting officially provided RGB values of each color sample in the standard color chart as reference parameter values; meanwhile, adopting the multiplication result of spectral power distribution SPD $(\lambda)$ of standard daylight D65 defined by International Commission on illumination and officially provided spectral reflectance R $(\lambda)$ of each color sample of the standard color chart as SPD $(\lambda) \times R\ (\lambda)$ (as shown in FIG. 3 and FIG. 4); setting the brightness of each color sample;

3) reproducing the SPD $(\lambda) \times R\ (\lambda)$ and the brightness of each color sample through a spectral tunable lighting source;

4) sequentially photographing the each reproduced SPD $(\lambda) \times R\ (\lambda)$ and brightness of each color sample through the camera with certain settings (f-number 5.6, exposure time 1/60 and ISO100) as shown in FIG. 5, and obtaining reproduced RGB values of each color sample after processing, which are denoted as R'G'B';

5) establishing a color calibration model by using a polynomial model by comparing RGB and R'G'B' (as shown in FIGS. 6-8); and 6) obtaining corresponding calibrated R"G"B" values by performing processing on the R'G'B' values obtained by camera modules by means of the color calibration module established in the step 5), thereby accomplishing the color calibration of the camera modules.

Embodiment II

Figure 9:
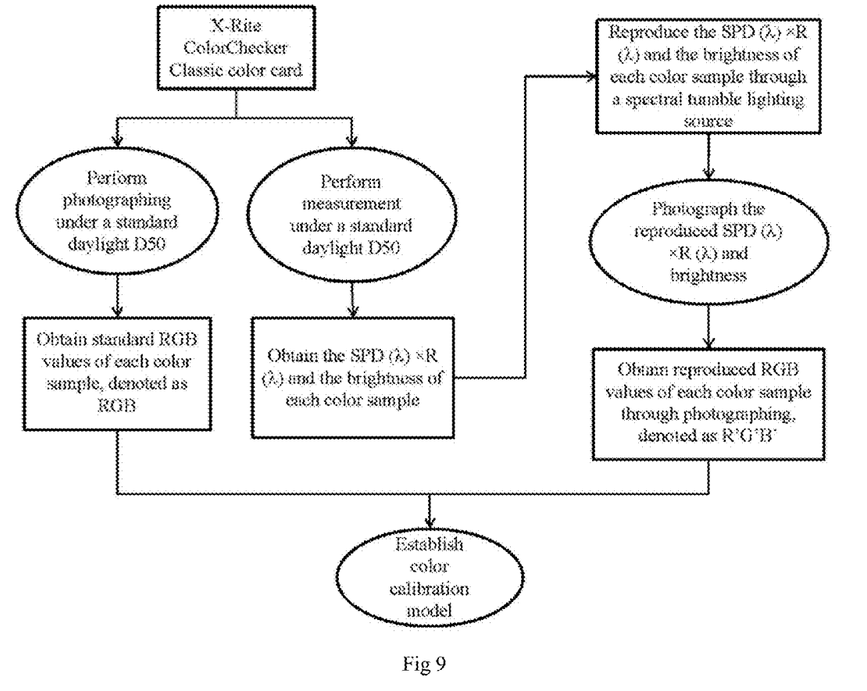
FIG. 9 is a flowchart according to an Embodiment II.
Figure 10:
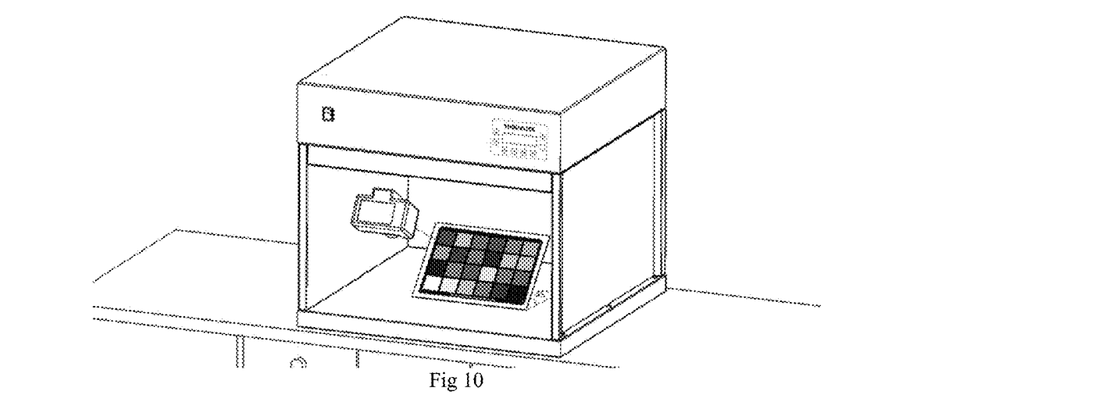
FIG. 10 is a diagram of photograph setting of a standard color chart under a standard lighting cabinet using D50 according to the Embodiment II.
Figure 11:
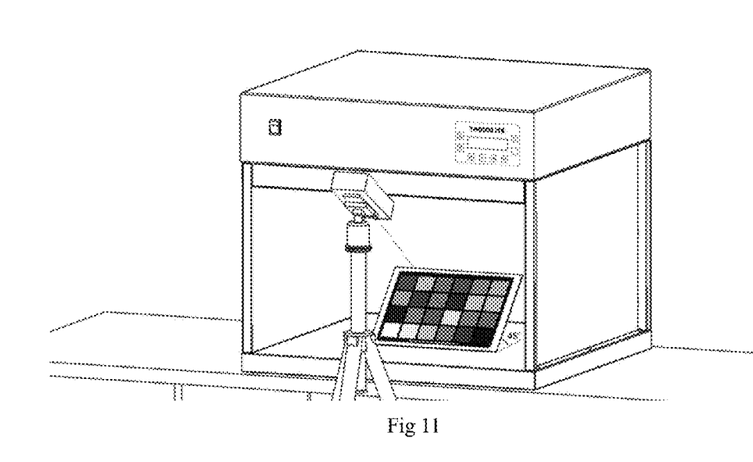
FIG. 11 is a diagram of measurement setting of a standard color chart under a standard lighting cabinet using D50 according to the Embodiment II.
Figure 12:
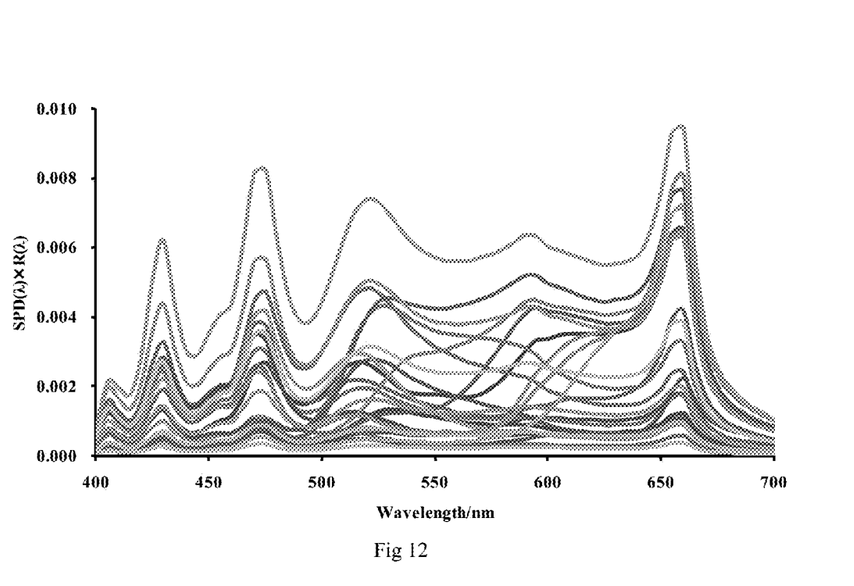
FIG. 12 is a diagram of a measured SPD $(\lambda) \times R\ (\lambda)$ of each color sample according to the Embodiment II.
Figure 13:
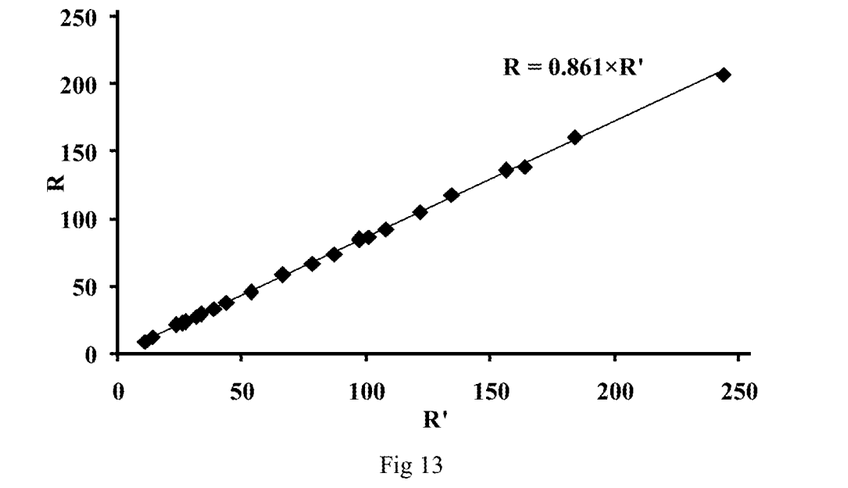
FIG. 13 is a diagram of linear calibration model of a red channel according to the Embodiment II.
Figure 14:
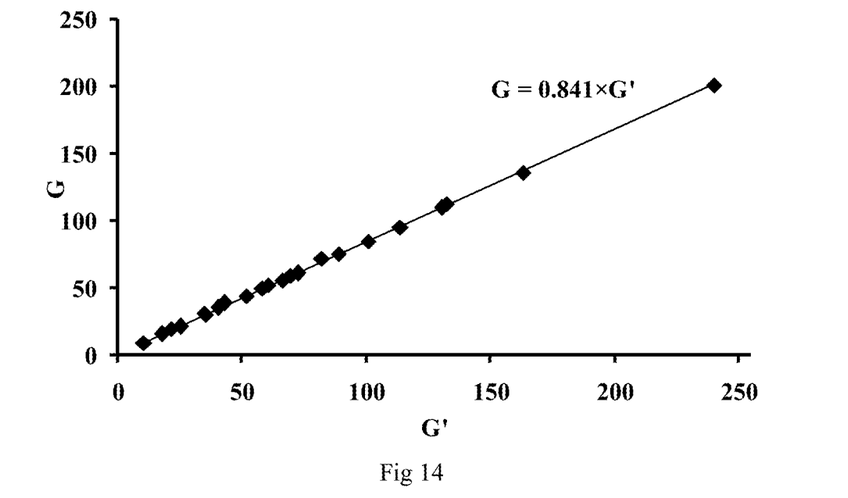
FIG. 14 is a diagram of linear calibration model of a green channel according to the Embodiment II.
Figure 15:
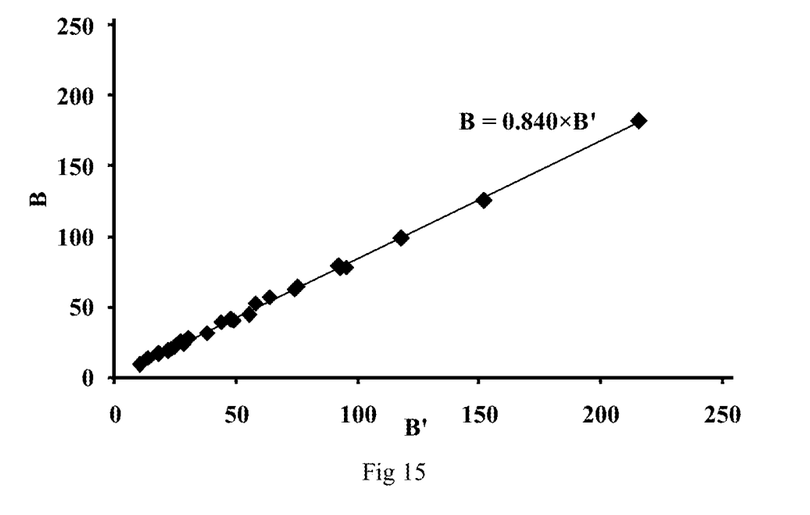
FIG. 15 is a diagram of linear calibration model of a blue channel according to the Embodiment II.

Taking obtaining RGB values of each color sample of a Canon EOS 650D three-channel RGB camera through photographing and measurement and obtaining the SPD $(\lambda) \times R\ (\lambda)$ and the brightness of each color sample through measurement as an example, the flowchart is as shown in FIG. 9, and the specific steps are as follows:

1) adopting a 24-color X-Rite ColorChecker Classic standard color chart;

2) as shown in FIG. 10, laying the color chart in the standard lighting cabinet using 0/45 geometry with daylight D50, photographing the color chart through a Canon EOS 650D single-lens reflex camera (f-number 5.6, exposure time 1/60 and ISO100), and obtaining the preference RGB values of each color sample in the color chart after processing; meanwhile, directly measuring the SPD $(\lambda)$ (the spectral power distribution of the standard lighting cabinet D50)$\times R\ (\lambda)$ (the spectral reflectance) and the brightness of the color sample with a spectroradiometer (as shown in FIG. 11), wherein the measured SPD $(\lambda) \times R\ (\lambda)$ of each color sample is as shown in FIG. 12;

3) accurately reproducing the SPD $(\lambda) \times R\ (\lambda)$ and the brightness of each color sample through a spectral tunable lighting source;

4) sequentially photographing the each reproduced SPD $(\lambda) \times R\ (\lambda)$ and brightness of each color sample by means of the camera module under the same settings (as shown in FIG. 5), and obtaining reproduced RGB values of each color sample after processing, which are denoted as R'G'B';

5) establishing a color calibration model by means of a linear model by comparing RGB with R'G'B' (as shown in FIGS. 13-15); and 6) obtaining corresponding calibrated R"G"B" values by processing the R'G'B' values obtained by camera modules by means of the color calibration module established in the step 5), thereby accomplishing the color calibration of the camera module.

The aforementioned contents specifically explain the embodiments of the present invention, but the present invention is not limited to the embodiments, those skilled in the art can further make various equivalent modifications or substitutions on the promise that the creativity of the present invention is not violated, and the modifications or substitutions are all included in the range limited by the claims of this application.

The invention claimed is:

1. A color calibration method of a camera module, characterized by adopting the following technical scheme:

1) selecting a standard color chart or a user-defined color chart;

2) providing multiple reference parameter values of each color sample in the color chart, the multiple reference parameter values are denoted as $X_1$ to $X_n$, wherein n is an integer from 1 to 10; meanwhile providing a multiplication result a spectral power distribution SPD ($\lambda$) and a spectral reflectance R ($\lambda$) of each color sample, and a brightness of each color sample in the color chart in a standard lighting environment;

3) reproducing the product of the spectral power distribution SPD ($\lambda$) and the spectral reflectance R ($\lambda$) and the brightness of each color sample by means of a spectral tunable lighting source;

4) sequentially photographing the each reproduced SPD ($\lambda$)×R ($\lambda$) and the brightness of each color sample by the camera module, and obtaining multiple reproduced parameter values after processing, which are denoted as $X_1'$ to $X_n'$;

5) respectively establishing a color calibration model by comparing each reference parameter values $X_1$ to $X_n$ with those $X_1'$ to $X_n'$;

6) processing the parameter values $X_1'$ to $X_n'$ obtained through photographing of each camera module by means of the color calibration models established in the step 5), so as to obtain corresponding calibrated parameter values $X_1''$ to $X_n''$, thereby accomplishing color calibration of the camera module.

2. The color calibration method of a camera module according to claim 1, characterized in that, in the step 2), the color chart is laid in a certain standard lighting environment and is photographed by using the camera module under certain settings, so that multiple reference parameter values of each color sample in the color chart are obtained after processing; meanwhile, in the standard lighting environment, the multiplication result of the spectral power distribution SPD ($\lambda$) and the spectral reflectance R ($\lambda$) of each color sample, and the brightness of each color sample in the color chart are measured by using corresponding measurement device.

3. The color calibration method of a camera module according to claim 1, characterized in that, n=3, the reference parameter values X1 to X3 are RGB values, and the computational formulas thereof are as follows:

$R = \Sigma \bar{r}(\lambda) \times SPD(\lambda) \times R(\lambda)$ $G = \Sigma \bar{g}(\lambda) \times SPD(\lambda) \times R(\lambda)$ $B = \Sigma \bar{b}(\lambda) \times SPD(\lambda) \times R(\lambda)$ wherein, $\bar{r}(\lambda)$, $\bar{g}(\lambda)$ and $\bar{b}(\lambda)$ are spectral sensitivity curves of red, green and blue channels of the camera module, SPD ($\lambda$) is the spectral power distribution of the standard lighting environment, R ($\lambda$) is the spectral reflectance of the color sample, and $\lambda$ is a wavelength.

4. The color calibration method of a camera module according to claim 1, characterized in that, the whole color calibration process needs to be conducted in a dark space without any other environmental lighting.

5. The color calibration method of a camera module according to claim 1, characterized in that, the standard color chart or the user-defined color chart in the step 1) comprises frequently-used 24-color X-Rite ColorChecker Classic, X-Rite ColorCheck Digital SG a color chart used in other industries, a user-defined color chart and a user-defined virtual color chart.

6. The color calibration method of a camera module according to claim 1, characterized in that, the camera module in the step 4) comprises a professional single-lens reflex camera, a consumer digital camera, an industrial camera, and a mobile device camera modules and the other imaging devices.

7. The color calibration method of a camera module according to claim 1, characterized in that, the color calibration model in the step 5) is selected from one of the following models: a linear model, an exponential model, a polynomial model, a logarithmic model, a power model and a table lookup method.

\* \* \* \* \*